(12) United States Patent
Moreton et al.

(10) Patent No.: US 8,698,802 B2
(45) Date of Patent: Apr. 15, 2014

(54) HERMITE GREGORY PATCH FOR WATERTIGHT TESSELLATION

(75) Inventors: Henry Packard Moreton, Woodside, CA (US); Ignacio Castaño Aguado, Davis, CA (US); Kirill Dmitriev, Moscow (RU)

(73) Assignee: Nvidia Corporation, Santa Clara, CA (US)

(*) Notice: Subject to any disclaimer, the term of this patent is extended or adjusted under 35 U.S.C. 154(b) by 685 days.

(21) Appl. No.: 12/898,422

(22) Filed: Oct. 5, 2010

(65) Prior Publication Data

US 2011/0080405 A1  Apr. 7, 2011

Related U.S. Application Data

(60) Provisional application No. 61/249,548, filed on Oct. 7, 2009.

(51) Int. Cl.
*G06T 17/20* (2006.01)
(52) U.S. Cl.
USPC ............... 345/423; 345/419; 345/420
(58) Field of Classification Search
USPC ......... 345/419, 420, 421, 423, 441, 442, 428, 345/582
See application file for complete search history.

(56) References Cited

U.S. PATENT DOCUMENTS

| | | | | |
|---|---|---|---|---|
| 6,198,979 | B1* | 3/2001 | Konno | 700/98 |
| 7,102,636 | B2* | 9/2006 | Reshetov et al. | 345/420 |
| 7,532,213 | B2* | 5/2009 | Sfarti | 345/423 |
| 7,768,511 | B2* | 8/2010 | Fenney | 345/423 |
| 2008/0273034 | A1* | 11/2008 | Fenney et al. | 345/423 |

OTHER PUBLICATIONS

Loop et al. "Approximating Subdivision Surfaces with Gregory Patches for Hardware Tessellation", Published 2009.*
Loop et al. "Approximating Catmull-Clark Subdivision Surfaces with Bicubic Patches", Published 2007.*
Microsoft Game Technology Conference 2008 "Gamefest 2008".*

* cited by examiner

*Primary Examiner* — Kimbinh T Nguyen
(74) *Attorney, Agent, or Firm* — Patterson + Sheridan, L.L.P.

(57) ABSTRACT

One embodiment of the present invention sets forth technique for watertight tessellation in a displaced subdivision surface. A subdivision surface is represented as a novel parametric quad patch that is continuous with respect to position (C0) and partial derivatives (C1) along boundaries as well as interior regions. The novel parametric quad patch is referred to herein as a Hermite Gregory patch and comprises a Hermite patch augmented to include a pair of twist vector parameters per vertex. Each pair of twist vectors is combined into one twist vector during evaluation, according to weights based on proximity to parametric boundaries. Evaluation yields an approximation mesh comprising a position for each vertex and a corresponding normal vector for the vertex. Displacement is performed based on the approximation mesh and a displacement map to generate a displaced approximation mesh that is reflective of the displaced subdivision surface.

20 Claims, 14 Drawing Sheets

HERMITE GREGORY PATCH FOR WATERTIGHT TESSELLATION

CROSS-REFERENCE TO RELATED APPLICATIONS

This application claims priority benefit to United States provisional patent application titled, "A HERMITE GREGORY PATCH FOR WATERTIGHT TESSELLATION," filed on Oct. 7, 2009 and having Ser. No. 61/249,548.

BACKGROUND OF THE INVENTION

1. Field of the Invention

The present invention generally relates to geometric processing in graphics systems and more specifically to a Hermite Gregory patch for watertight tessellation.

2. Description of the Related Art

Modern three-dimensional (3D) graphics systems are typically configured to generate one or more graphics images from one or more graphics scenes, with each graphics scene comprising one or more scene objects. The one or more graphics images are typically displayed or stored for display later. Each scene object is represented by a corresponding geometric model. Each geometric model may comprise a collection of abstract geometric objects such as triangles, patches, or meshes.

A subdivision surface is a type of geometric object described concisely by relatively few control points that define a coarse control mesh and a set of subdivision rules that specify how the control mesh may be refined using subdivision into a more highly detailed control mesh. The subdivision rules may be analyzed to permit the computation of a highly tessellated representation of a desired scene object. Alternatively, the control mesh may be recursively processed according to the subdivision rules to generate a limit surface that closely approximates or converges on a scene object or a portion of the scene object. The limit surface is typically approximated as a set of abutting patches, such as Bezier patches. In many applications, the mesh of patches must be constructed to form a watertight tessellation, meaning a mesh of triangles tessellated from the mesh of patches must not have cracks or holes, and should not include any overlapping geometry. Additionally, the mesh of patches must be constructed to form a watertight, tangent-smooth mesh of patches. In a conventional graphics processing unit, each patch in the mesh of patches is tessellated into two or more triangles, representing a portion of the mesh of triangles. The mesh of triangles should be watertight because the mesh of triangles is ultimately used to generate a scene object within a given graphics image. One necessary condition of a watertight mesh of triangles is that each patch within the mesh of patches is parametrically continuous in position (C0) with respect to each boundary of adjacent patch.

A displaced subdivision surface is a form of subdivision surface that can represent surface detail on an otherwise relatively smooth limit surface. A displacement map may be used to store scalar displacement values for generating geometric offsets from the limit surface to represent the surface detail on the limit surface. Gregory patches are generated to closely approximate a conventional Catmull-Clark subdivision limit surface. The resulting subdivision surface is parametrically continuous with respect to partial derivatives for the surface (C1), and therefore C0. However, auxiliary tangent surfaces are still needed in existing art in order to generate a watertight tessellation when the resulting subdivision surface is a displaced subdivision surface. The auxiliary tangent surfaces conventionally require substantial additional data storage, which is quite limited in conventional graphics processing units. As a result, conventional techniques for watertight tessellation of displaced subdivision surfaces are relatively inefficient with respect to memory utilization, limiting usage of such techniques within graphics processing units.

Accordingly, what is needed in the art is a system and method for efficiently representing displaced subdivision surfaces for watertight tessellation.

SUMMARY OF THE INVENTION

One embodiment of the present invention sets forth a method for tessellating a displaced subdivision surface associated with an object in a graphics scene. The method includes receiving a subdivision surface that includes a first patch and a second patch that share two vertices, transforming the first patch into a first transformed patch and the second patch into a second transformed patch, sampling each of the first and second transformed patches to generate a limit surface that includes a plurality of sample points, evaluating the sample points included in the limit surface to generate an approximation mesh that includes a plurality of evaluated vertices, where each evaluated vertex includes at least a position vector and a normal vector, and displacing each evaluated vertex of the approximation mesh based on a displacement map to generate a displaced approximation mesh that is reflective of the displaced subdivision surface and is used to render the scene object.

One advantage of the disclosed method is that a displaced subdivision surface may be represented using patches specified by a set of concise, easily shared vertex parameters, thereby reducing required memory requirements for watertight tessellation of the displaced subdivision surface compared to prior art solutions.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
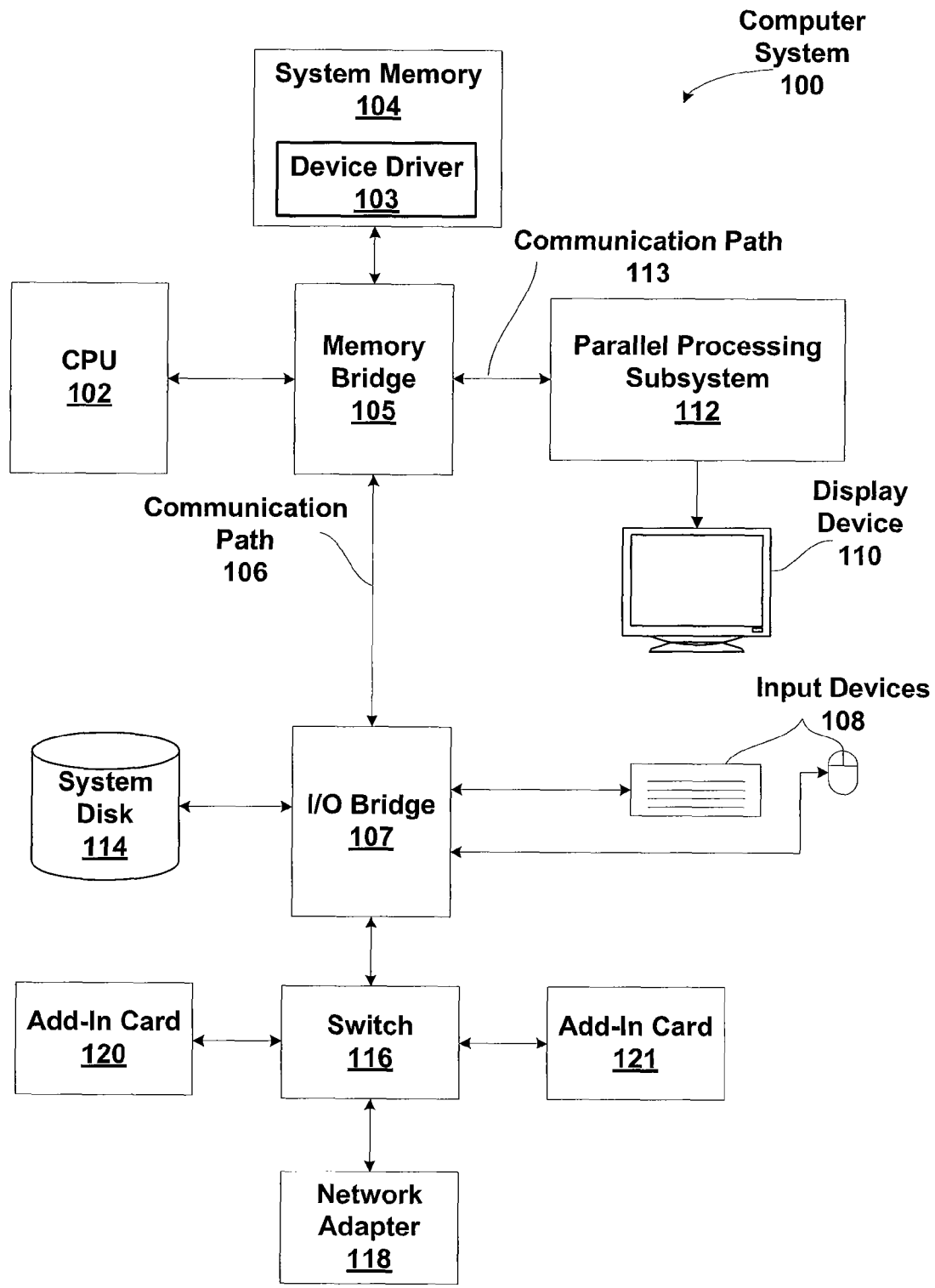
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
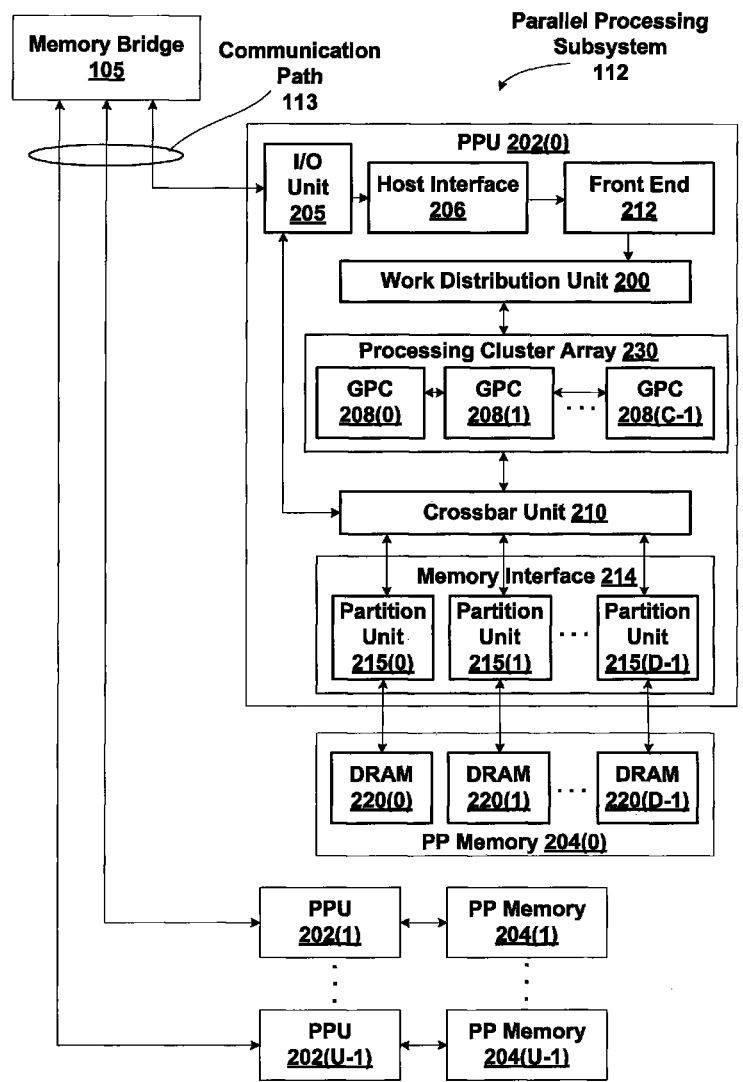
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
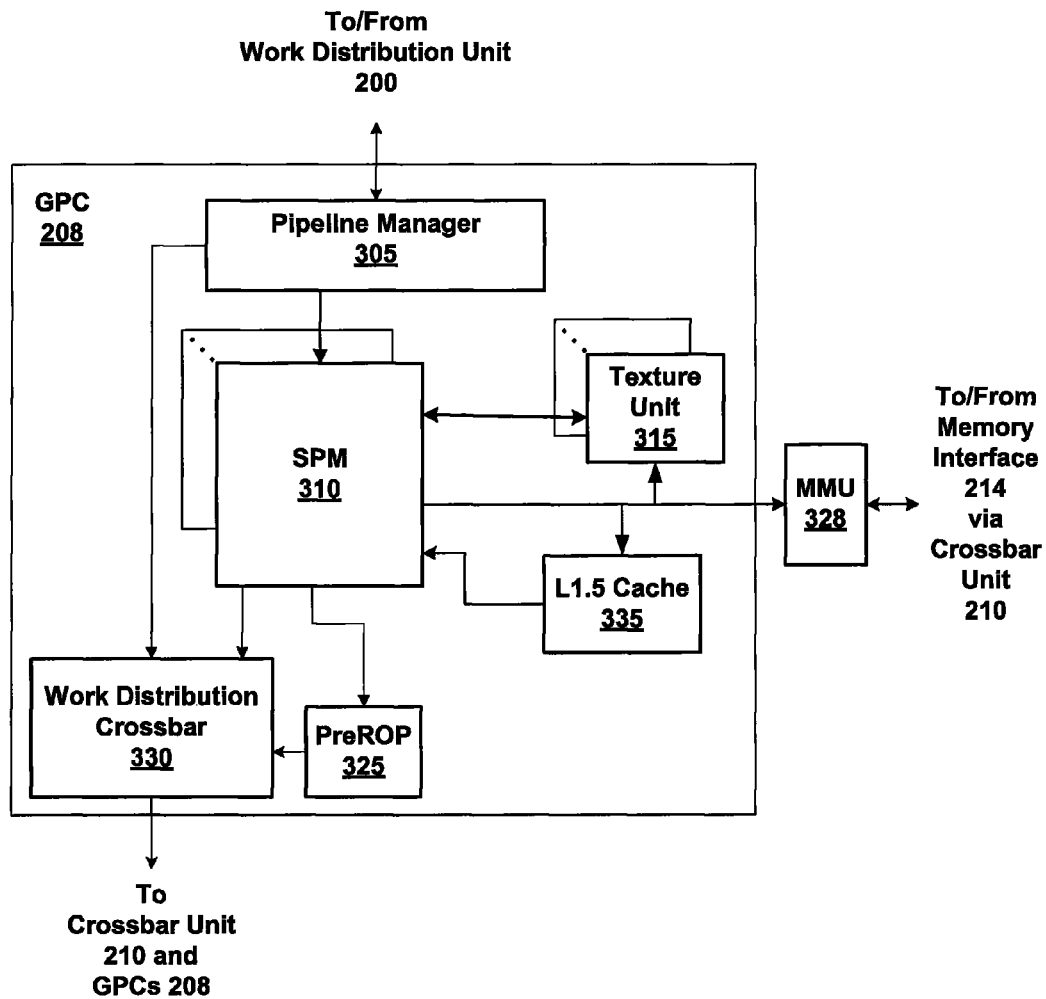
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208.

The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
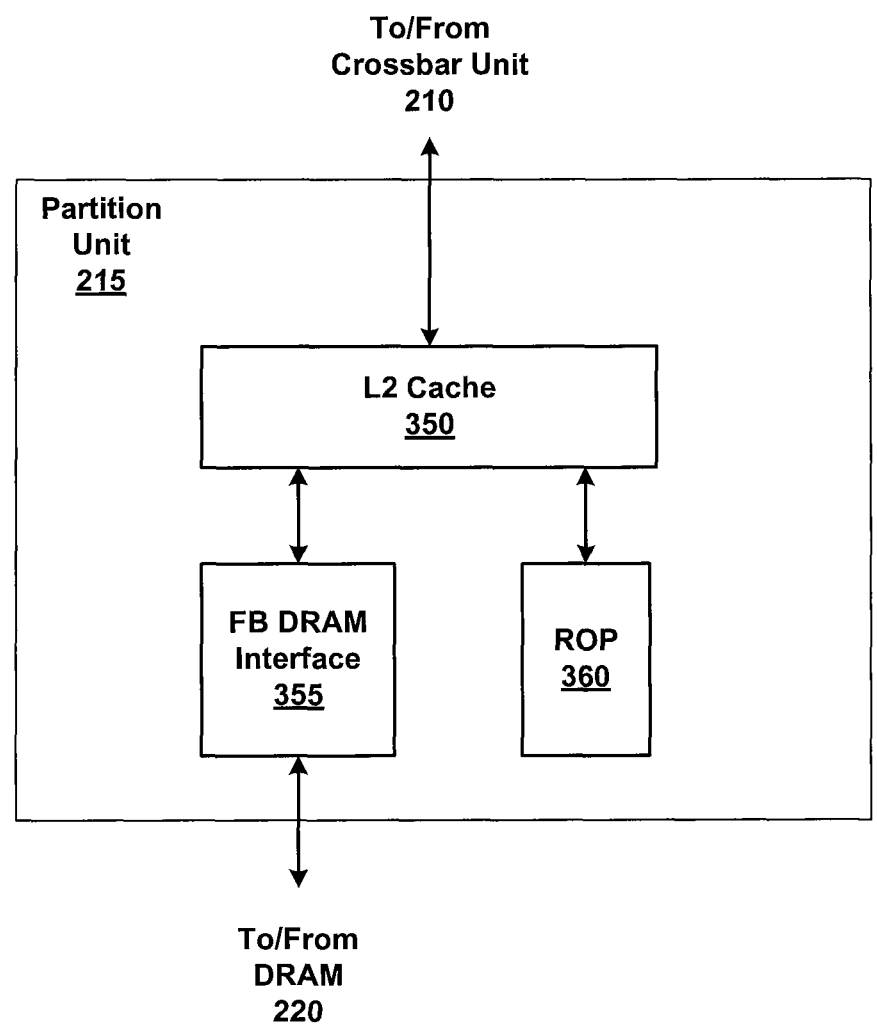
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
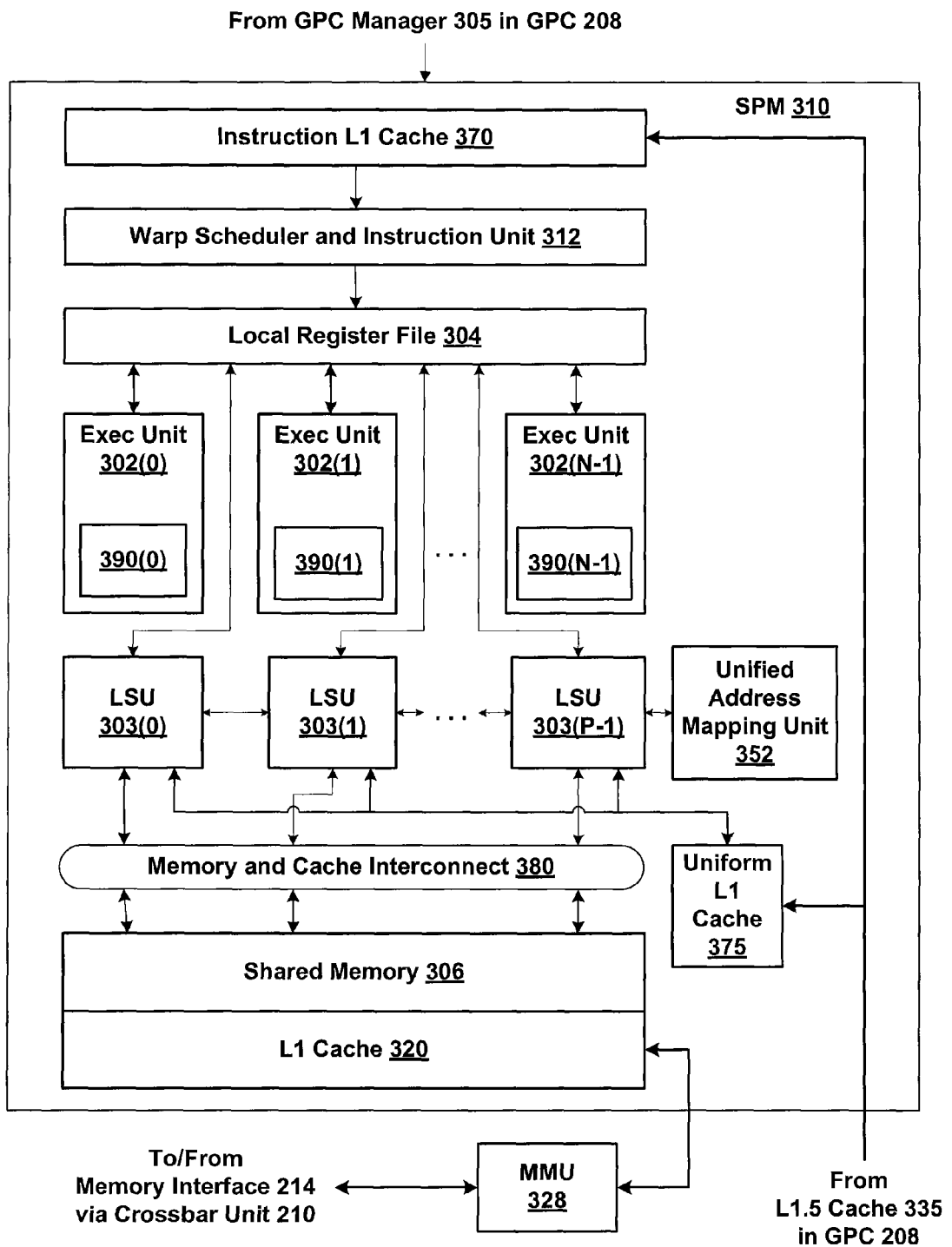
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 371, the shared memory 306, and the L1 cache 320 via a memory and cache interconnect 380. The uniform L1 cache 371 is configured to receive read-only data and constants from memory via the L1.5 Cache 335.

Each parameter unit 390 within a corresponding execution unit 302, is configured to generate a fixed-point parameter. In one embodiment the fixed-point parameter represents a value from 0.0 to 1.0 with sixteen-bit resolution. The fixed-point parameters are generates to provide an integral number of divisions between 0.0 and 1.0. A given fixed-point parameter may be accessed by a shading program executing on a respective execution unit 302.

In other implementations, the parameter unit 390 may reside in other locations. For example, in one embodiment, a different parameter unit 390 may reside within each GPC 208 separate and distinct from the SPM 310.

Graphics Pipeline Architecture

Figure 4:
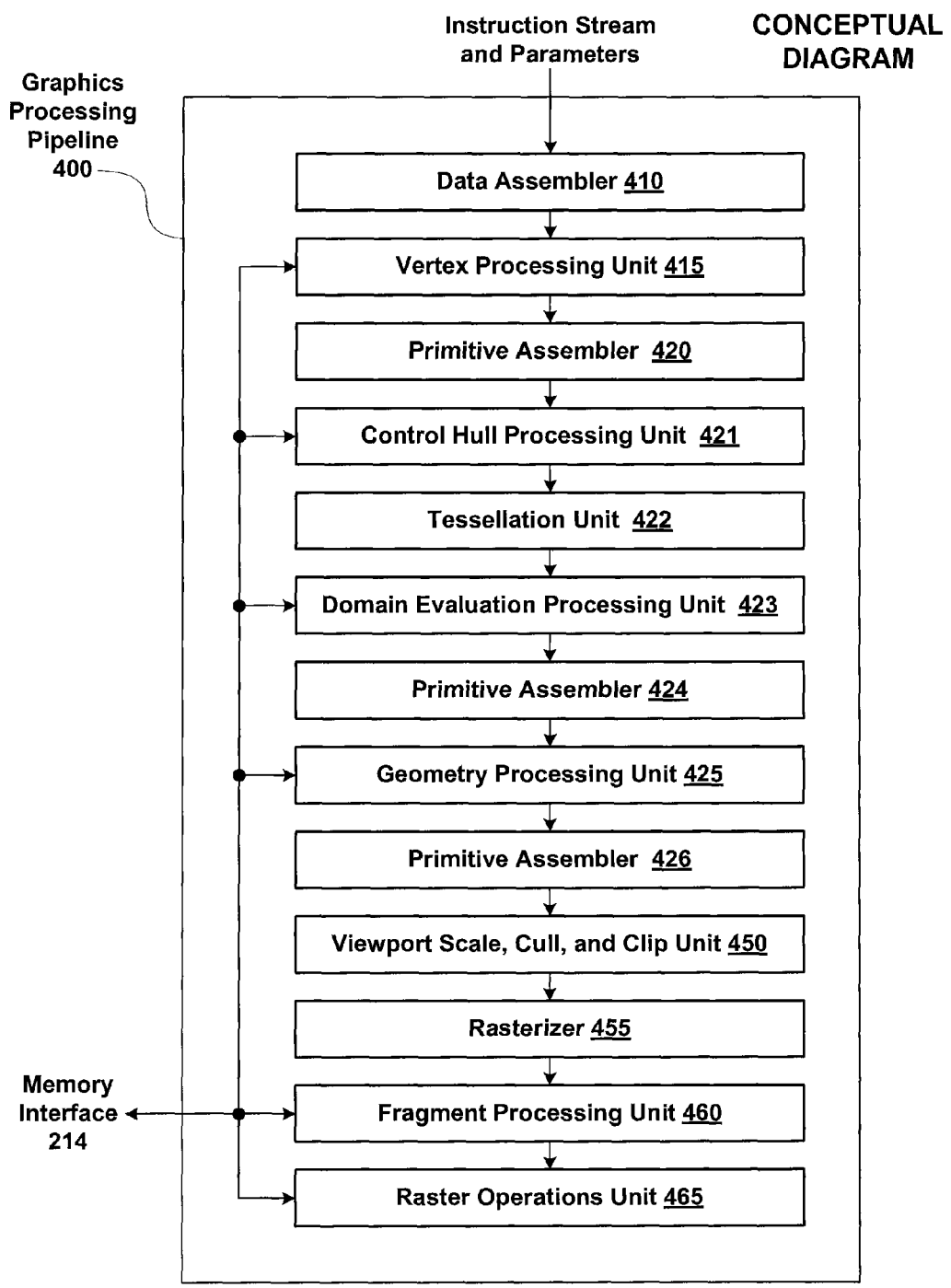
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by control hull processing unit 421. Graphics primitives include triangles, line segments, points, patches, and the like.

The control hull processing unit 421 transforms control points for a geometric patch from a basis representation to an application representation for tessellation or evaluation. The control hull processing unit 421 also computes edge and interior tessellation factors for geometric patches. A tessellation factor may quantify a view-dependent level of detail associated with the patch. A tessellation unit 422 is configured to receive the tessellation factors for edges of a patch and to tessellate the patch into multiple geometric primitives such as triangle or quad primitives, which are transmitted to a domain evaluation processing unit 423. The domain evaluation processing unit 423 operates on parametric coordinates for a geometric primitive to generate a surface representation and vertex attributes for each vertex associated with the geometric primitive. In certain embodiments, the domain evaluation processing unit 423 executes a domain shader program configured to compute locations and corresponding attributes for positions on the surface corresponding to the parametric coordinates provided by the tessellation unit 422.

Primitive assembler 424 receives vertex attributes from domain evaluation processing unit 423, reading stored vertex attributes, as needed, and constructs graphics primitived for processing by geometry processing unit 425. The primitive assembler 424 may also receive topological information from the tessellation unit 422 describing how the mesh of triangles is formed from the vertices computed in the domain evaluation processing unit 423. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Hermite Gregory Patch for Watertight Tessellation

A Hermite Gregory patch is a novel three-dimensional (3D) geometric patch representation combining characteristics found in both Hermite patches and Gregory patches. The Hermite Gregory patch is a function in parametric space, where each of two parameters ("u" and "v") may independently vary from zero to one. A parametric patch, such as a Hermite Gregory patch, may be expressed in general as a parametric surface function given in Equation 1.

$$\vec{S}(u,v) = \{x(u,v), y(u,v), z(u,v)\} \qquad \text{(Equation 1)}$$

The Hermite Gregory patch will be described in greater detail below in the context of generating a watertight tessellation, and in particular a watertight tessellation of displaced subdivision surface. Importantly, the Hermite Gregory patch is parametrically continuous in position (C0) and with respect to partials (C1), and completely defined by vertex parameters defined on the corners of the patch. These vertex parameters may be easily shared by abutting patches having a shared boundary. The shared vertex parameters are identically computed from identical source data, enabling a watertight rendering of the shared boundary.

A watertight tessellation refers a mesh of triangles generated by a tessellation process, defined by vertices, where vertices that are logically the same are defined by bit-exact representations for each related parameter. For example, if two triangles share a logically identical vertex within the watertight tessellation, then a set of "x," "y," and "z" coordinate values for the vertex associated with a first of the two triangles is bit-wise identical to a set of "x," "y," and "z" coordinate values for the corresponding logically identical vertex associated with a second of the two triangles. For a closed mesh defined by a collection of independent triangles, each edge in the mesh should have exactly two incident triangles. A given watertight tessellation may be evaluated from another geometric basis, such as a mesh of displacement mapped patches, comprising individual patches and a corresponding displacement map.

Figure 5A:
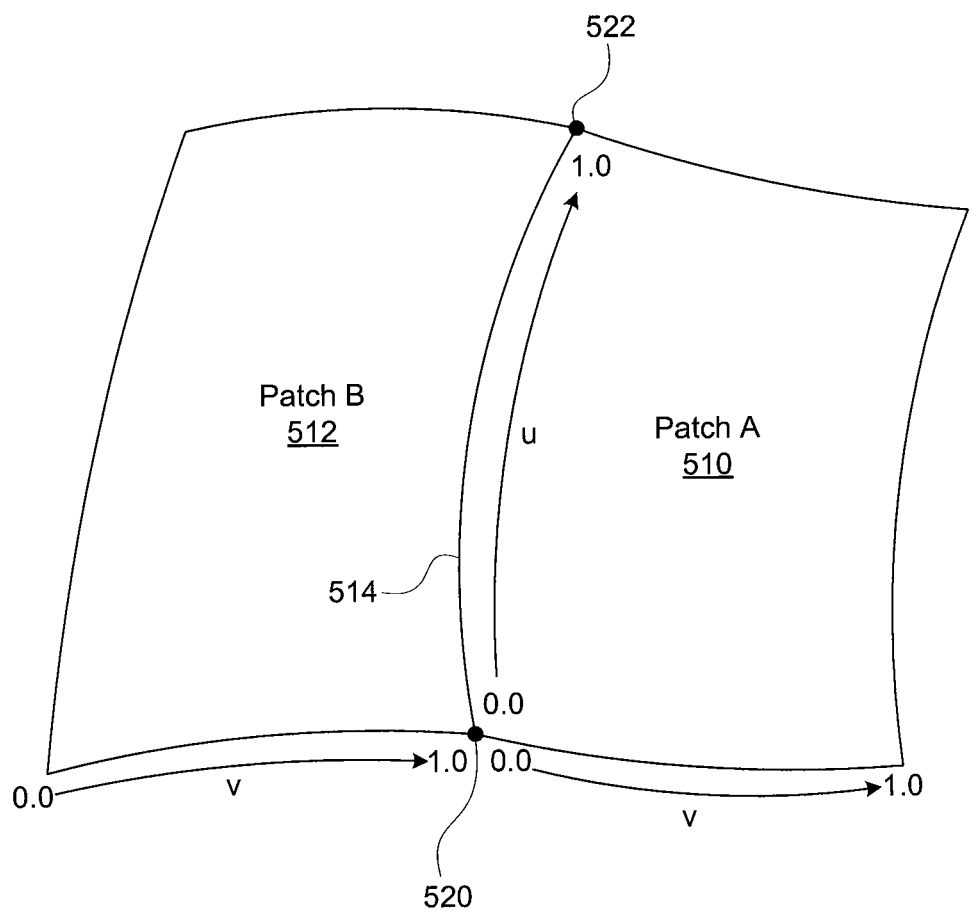
FIG. 5A illustrates two parametric patches within a mesh of patches, according to one embodiment of the present invention.

FIG. 5A illustrates two parametric patches 510, 512 within a mesh of patches, according to one embodiment of the present invention. Patch A 510 (represented as $\vec{A}(u, v)$) and patch B 512 (represented as $\vec{B}(u, v)$) may be evaluated according to the general form of Equation 1. A partial derivative may be taken at any point on patch 510 A or 512 B. A partial derivative of $\vec{S}(u, v)$ in u is represented by $\vec{S}_u(u, v)$, while a partial derivative of $\vec{S}(u, v)$ in v is represented by $\vec{S}_v(u, v)$. Watertight tessellation for displacement mapping requires positional continuity (C0 continuity) and first partial continuity (C1 continuity) along shared boundary 514 between control points 520 and 522. In other words, Equations 2 through 4 must be true along shared boundary 514 for watertight tessellation. Further, the values must be bit-for-bit equal, not simply logically equal.

$$\vec{A}(u,0) = \vec{B}(u,1) \qquad \text{(Equation 2)}$$

$$\vec{A}_u(u,0) = \vec{B}_u(u,1) \qquad \text{(Equation 3)}$$

$$\vec{A}_v(u,0) = \vec{B}_v(u,1) \qquad \text{(Equation 4)}$$

Figure 5B:
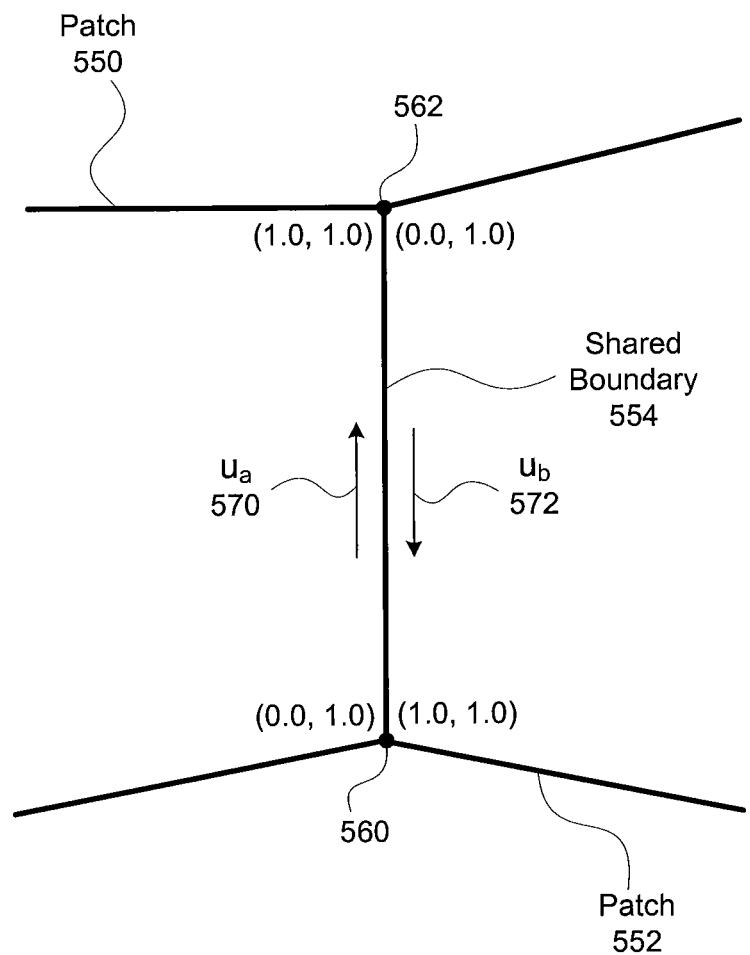
FIG. 5B illustrates two patches having a reversed parameterization along the shared boundary, according to one embodiment of the present invention.

FIG. 5B illustrates two patches 550, 552 having a reversed parameterization along the shared boundary 554, according to one embodiment of the present invention. Persons skilled in the art will recognize that reverse parameterization is quite common and is unavoidable in general. As shown, patch 550 is parameterized with u 570 set to 0.0 at control point 560 and 1.0 at control point 562. However, patch 552 is parameterized with u 572 set to 1.0 at control point 560 and 0.0 at control point 562. Additional shared control points (not shown), in combination with the control points 560 and 562, completely specify shard boundary 554. One requirement of watertight tessellation is that abutting patches are consistently evaluated regardless of parameterization direction.

In the above case of two abutting patches 550, 552, control points that define shared boundary 554 and partials along shared boundary 554 should be identical as a condition to yielding a watertight tessellation. To compute a watertight tessellation of the two patches, new vertices computed along the shared boundary for each patch should be computed at identical parametric locations for both patches. Furthermore, operations related to computing a given shared vertex location for one patch should follow a series of operations such that any related floating point math does not introduce inequalities between each of two computations for computing the vertex location. In the event of a reversed parameterization, vertices should be computed at symmetric parametric locations such that the reversed parameterization does not cause mismatches. To accomplish this, any common series of mathematical operations should be independent of the order of computation for the control points and independent of the order of the control points defining the patch boundary. In other words, evaluating each patch should be conducted using a sequence of arithmetic operations that are ordered to avoid round-off errors that are dependent on control point order.

In one embodiment, floating point values are used to represent the "u" and "v" parameters, and each patch is evaluated in an order that is invariant with respect to associated parameters. In an alternative embodiment, the "u" and "v" parameters are represented as fixed-point fractions. Because mantissa bits in the fixed-point fraction have consistent values throughout a represented range of 0.0 through 1.0, inconsistencies due to round-off errors may be avoided in computing a fixed-point value of $u_A = 1 - u_B$ using the fixed-point parameter for $u_B$. Each fixed-point coordinate (u,v) is converted, without any change in value or loss of precision, to a floating-point representation that maybe used for further operations, such as evaluating a given patch. Importantly, a given floating-point coordinate that is derived from a corresponding fixed-point coordinate is not susceptible to inconsistencies due to round-off errors, because the fixed-point representation is inherently consistent and converting fixed-point values to floating-point values is an exact process. Therefore, adjacent patches may be consistently evaluated despite reversed parameterizations along shared boundaries.

A tessellation function provides "u" and "v" parameters for evaluation of a particular patch. In one embodiment, the tessellation function resides in tessellation unit 422 of FIG. 4, and an evaluation function resides in domain evaluation processing unit 423. Importantly, a given shared boundary may arbitrarily have either a consistent or a reversed parameterization.

Figure 6:
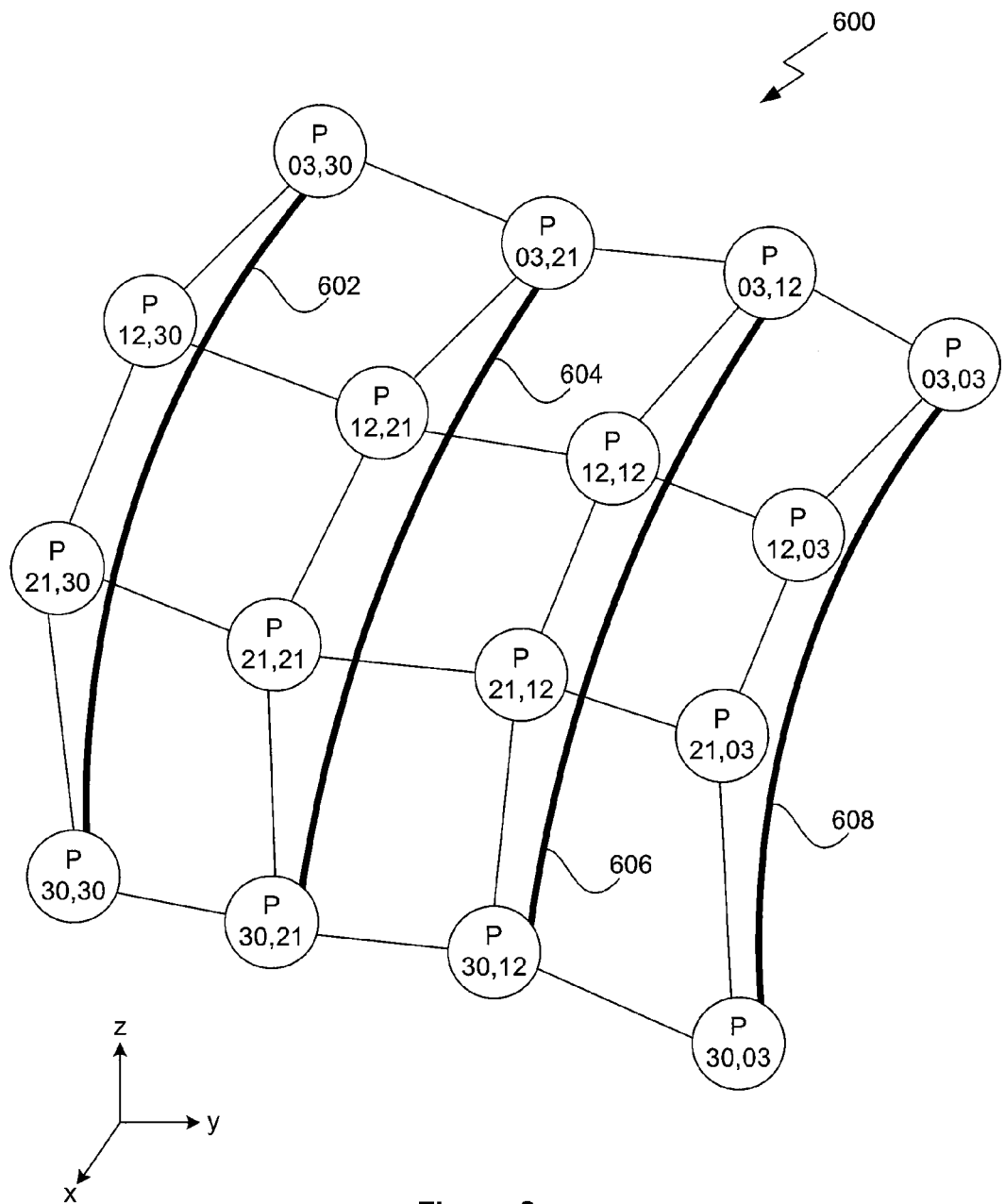
FIG. 6 illustrates control points used to define a Bezier patch, according to one embodiment of the present invention.

FIG. 6 illustrates control points 600 used to define a Bezier patch, according to one embodiment of the present invention. The control points 600 comprise sixteen control points P, labeled P(30,30) through P(03,03). Bezier curves 602, 604, 606, and 608 illustrate the control points (curves) P collectively defining the Bezier patch. Bezier curve 602 is defined by control points P(30,30), P(21,30), P(12,30), and P(03,30). Similarly, Bezier curve 604 is defined by control points P(30, 21), P(21,21), P(12,21), and P(03,21); Bezier curve 606 is defined by control points P(30,12), P(21,12), P(12,12), and P(03,12); and, Bezier curve 608 is defined by control points P(30,03), P(21,03), P(12,03), and P(03,03). A Bezier curve is given by Equation 5.

$$\vec{C}(u) = [\, u^3 \;\; u^2 \;\; u \;\; 1 \,] \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix} \begin{bmatrix} P_{03} \\ P_{12} \\ P_{21} \\ P_{30} \end{bmatrix} \quad \text{(Equation 5)}$$

A Bezier patch is given by Equation 6.

$$\vec{S}(u, v) = [\, u^3 \;\; u^2 \;\; u \;\; 1 \,] \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix} \cdot$$

$$\begin{bmatrix} P_{03,03} & P_{12,03} & P_{21,03} & P_{30,03} \\ P_{03,12} & P_{12,12} & P_{21,12} & P_{30,12} \\ P_{03,21} & P_{12,21} & P_{21,21} & P_{30,21} \\ P_{03,21} & P_{12,21} & P_{21,21} & P_{30,21} \end{bmatrix} \cdot$$

$$\begin{bmatrix} -1 & 3 & -3 & 1 \\ 3 & -6 & 3 & 0 \\ -3 & 3 & 0 & 0 \\ 1 & 0 & 0 & 0 \end{bmatrix}^T \begin{bmatrix} v^3 \\ v^2 \\ v \\ 1 \end{bmatrix} \quad \text{(Equation 6)}$$

One challenge associated with displacement mapping of Bezier patches in the context of watertight tessellation is that consistent (watertight) normals must be computed, since each displacement operation is typically applied in a normal direction. Specifically, when computing watertight tessellation of a pair of Bezier patches, related computations should be consistent because the four shared control points along the boundary are identical. A surface normal is an attribute of a Bezier patch (as is position), however the normal is computed from a cross-product of two associated partial derivatives. The formulas for the two partials along the u=0 boundary are given below.

$$\vec{S}_u(u, v) = [\, 3u^2 \;\; 2u \;\; 1 \;\; 0 \,] \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix} \cdot$$

$$\begin{bmatrix} P_{03,03} & P_{12,03} & P_{21,03} & P_{30,03} \\ P_{03,12} & P_{12,12} & P_{21,12} & P_{30,12} \\ P_{03,21} & P_{12,21} & P_{21,21} & P_{30,21} \\ P_{03,21} & P_{12,21} & P_{21,21} & P_{30,21} \end{bmatrix} \cdot$$

$$\begin{bmatrix} -1 & 3 & -3 & 1 \\ 3 & -6 & 3 & 0 \\ -3 & 3 & 0 & 0 \\ 1 & 0 & 0 & 0 \end{bmatrix}^T \begin{bmatrix} v^3 \\ v^2 \\ v \\ 1 \end{bmatrix} \quad \text{(Equation 7)}$$

$$\vec{S}_u(0, v) =$$

$$[\, -3 \;\; 3 \;\; 0 \;\; 0 \,] \cdot \begin{bmatrix} P_{03,03} & P_{12,03} & P_{21,03} & P_{30,03} \\ P_{03,12} & P_{12,12} & P_{21,12} & P_{30,12} \\ 0 & 0 & 0 & 0 \\ 0 & 0 & 0 & 0 \end{bmatrix} \cdot$$

$$\begin{bmatrix} -1 & 3 & -3 & 1 \\ 3 & -6 & 3 & 0 \\ -3 & 3 & 0 & 0 \\ 1 & 0 & 0 & 0 \end{bmatrix}^T \begin{bmatrix} v^3 \\ v^2 \\ v \\ 1 \end{bmatrix} \quad \text{(Equation 8)}$$

-continued $$\vec{S}_u(u,v) = [u^3 \ u^2 \ u \ 1] \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix} \cdot \begin{bmatrix} P_{03,03} & P_{12,03} & P_{21,03} & P_{30,03} \\ P_{03,12} & P_{12,12} & P_{21,12} & P_{30,12} \\ P_{03,21} & P_{12,21} & P_{21,21} & P_{30,21} \\ P_{03,21} & P_{12,21} & P_{21,21} & P_{30,21} \end{bmatrix} \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix}^T \begin{bmatrix} 3v^2 \\ 2v \\ 1 \\ 0 \end{bmatrix}$$
(Equation 9)

$$\vec{S}_u(0,v) = \begin{bmatrix} P_{03,03} & P_{12,03} & P_{21,03} & P_{30,03} \\ 0 & 0 & 0 & 0 \\ 0 & 0 & 0 & 0 \\ 0 & 0 & 0 & 0 \end{bmatrix} \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix}^T \begin{bmatrix} 3v^2 \\ 2v \\ 1 \\ 0 \end{bmatrix}$$
(Equation 10)

Persons skilled in the art will recognize that $\vec{S}_u(0,v)$ is a cubic polynomial in v, involving two rows of control points. Furthermore, $\vec{S}_v(0,v)$ is a quadratic polynomial in v, involving just the boundary control points. A cross-boundary tangent ($\vec{S}_u(0,v)$) is not necessarily continuous because control points not specified along the shared boundary are required in computing the partials at the shared boundary. One prior art solution is to carry an additional tangent surface whose boundary control points are shared among neighboring patches. However, this solution requires additional data to be stored within a graphics processing unit and additional computational effort to process the additional data, making such prior art approaches undesirable.

An additional problem with using Bezier patches is that it is, in general, not possible to construct a C1 surface composed solely of Bezier patches. Any pair can be made to be logically C1, but a full network or mesh of patches requires a global solution. As noted above, even patches constructed to be logically C1, fail to be bit-for-bit C1 due to non-shared definitions, and floating-point rounding errors.

Figure 7:
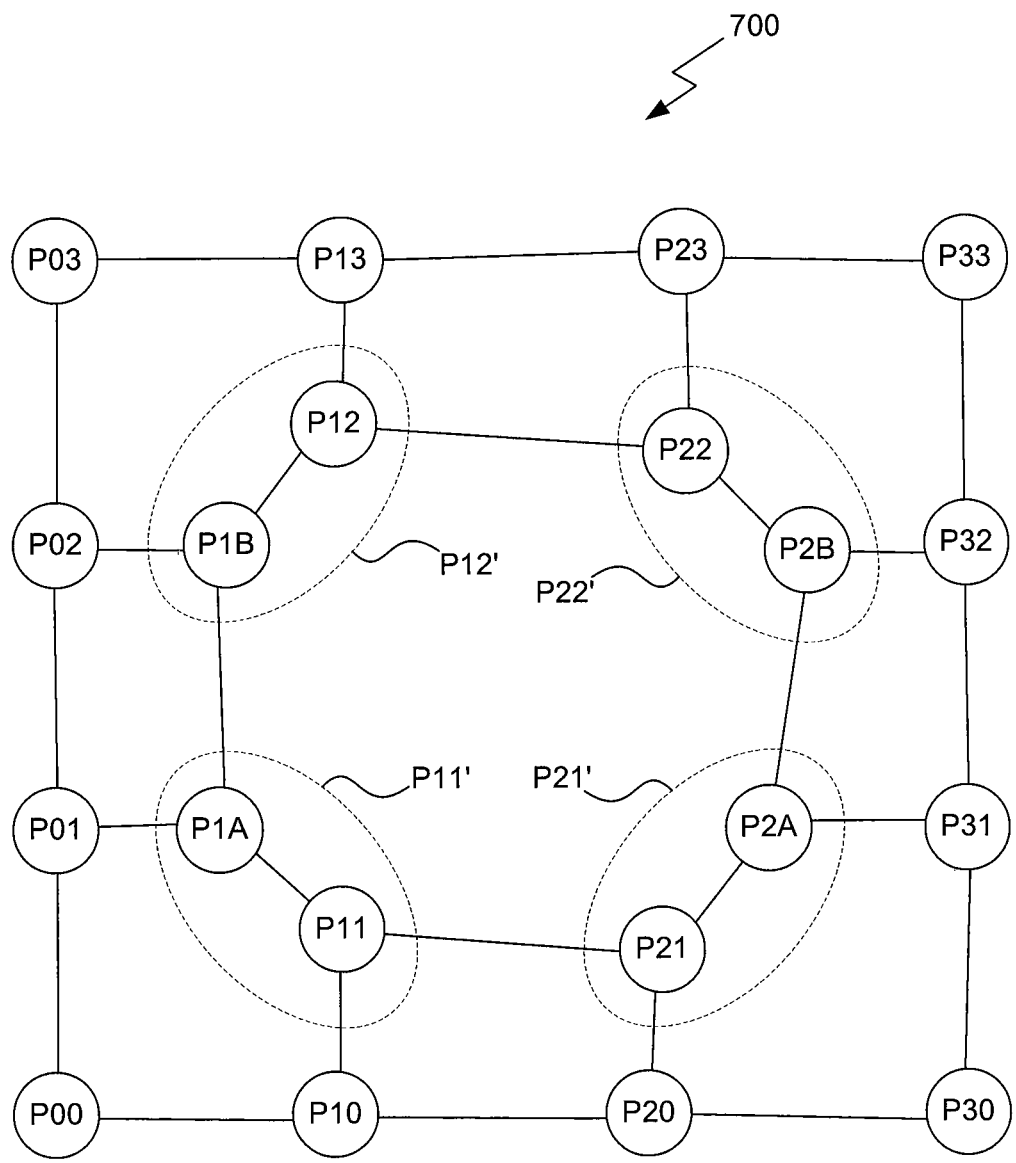
FIG. 7 illustrates control points configured to specify a Gregory patch, according to one embodiment of the invention.

FIG. 7 illustrates control points 700 configured to specify a Gregory patch, according to one embodiment of the invention. The control points 700 comprise twenty individual control points P00 through P33. Gregory patches may be used to approximate a subdivision surface. A bi-cubic Gregory patch is a generalization of a Bezier patch. A Gregory patch augments a Bezier formulation with four additional control points paired with existing interior control points. For example, control point P1A is paired with existing control point P11; control point P1B is paired with existing control point P12, and so forth. The Gregory formulation makes the formation of a C1 mesh or quilt of patches a purely local computation and thus simpler and more efficient to create.

Persons skilled in the art will recognize that a Gregory patch may be evaluated by first blending the interior control points and then evaluating the resulting Bezier patch. The blend of interior control points is dependent on how close a given control point is to a respective boundary. For example, control points P11 and P1A are blended together to generate control point P11'. Similarly, control points P12 and P1B are blended together to generate P12', and so forth. Control points P11', P12', P21', and P22', in combination with perimeter control points P00 through P10 (clock wise) specify the resulting Bezier patch. By decoupling cross-boundary tangents adjacent to a corner, a C1 composite surface may be constructed. However, generating a watertight tessellation from a Gregory patch has limitations because the Gregory patch is based on a generalization of the Bezier patch.

Figure 8:
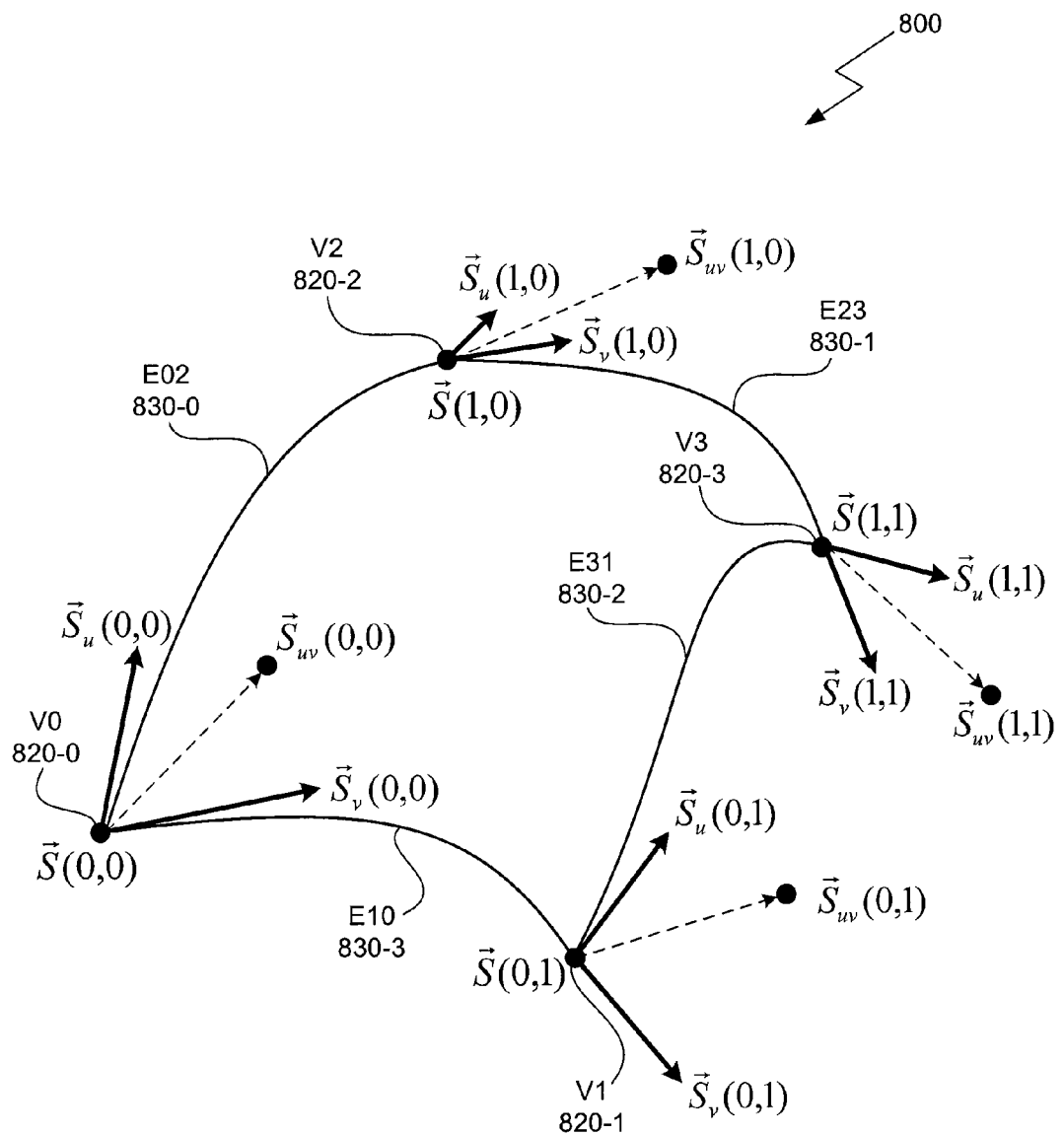
FIG. 8 illustrates a Hermite patch and related control parameters, according to one embodiment of the present invention.

FIG. 8 illustrates a Hermite patch 800 and related control parameters, according to one embodiment of the present invention. Each vertex 820 includes parameters for a position ($\vec{S}()$), a partial in u ($\vec{S}_u()$), a partial in v ($\vec{S}_v()$), and a "twist" vector ($\vec{S}_{uv}()$). For example vertex V0 820-0 includes position $\vec{S}(0,0)$, partial in u $\vec{S}_u(0,0)$, partial in v $\vec{S}_v(0,0)$, and twist vector $\vec{S}_{uv}(0,0)$. Similarly, vertex 820-1 includes position $\vec{S}(0,1)$, partial in u $\vec{S}_u(0,1)$, partial in v $\vec{S}_v(0,1)$, and twist vector $\vec{S}_{uv}(0,1)$, and so forth.

Each edge 830 is completely specified with respect to position and partials by two end vertices. For example edge 830-0 is completely specified by parameters for vertices V0 820-0 ($\vec{S}(0,0)$, $\vec{S}_u(0,0)$, $\vec{S}_v(0,0)$, $\vec{S}_{uv}(0,0)$) and V2 820-2 ($\vec{S}(1,0)$, $\vec{S}_u(1,0)$, $\vec{S}_v(1,0)$, $\vec{S}_{uv}(1,0)$). Importantly, partials along edge 830-0 are also completely specified by the parameters for vertices V0 820-0 and V2 820-2. Consequently, a mesh of Hermite patches is C0 and C1 along shared boundaries.

A Hermite curve is specified by control points C( ) and derivatives of the control points C'( ) as given by Equation 11.

$$\vec{C}(u) = [u^3 \ u^2 \ u \ 1] \cdot \begin{bmatrix} 2 & 1 & 1 & -2 \\ -3 & -2 & -1 & 3 \\ 0 & 1 & 0 & 0 \\ 1 & 0 & 0 & 0 \end{bmatrix} \cdot \begin{bmatrix} \vec{C}(0) \\ \vec{C'}(0) \\ \vec{C'}(1) \\ \vec{C}(1) \end{bmatrix}$$
(Equation 11)

A Hermite patch is specified by four vertices, and each of the four vertices includes four parameters (position $\vec{S}()$, partial in u $\vec{S}_u()$, partial in v $\vec{S}_v(0,0)$, and twist vector $\vec{S}_{uv}()$), as illustrated in Equation 12.

$$\vec{S}_u(u,v) = [u^3 \ u^2 \ u \ 1] \cdot \begin{bmatrix} 2 & 1 & 1 & -2 \\ -3 & -2 & -1 & 3 \\ 0 & 1 & 0 & 0 \\ 1 & 0 & 0 & 0 \end{bmatrix} \cdot \begin{bmatrix} \vec{S}(0,0) & \vec{S}_v(0,0) & \vec{S}_v(0,1) & \vec{S}(0,1) \\ \vec{S}_u(0,0) & \vec{S}_{uv}(0,0) & \vec{S}_{uv}(0,1) & \vec{S}_u(0,1) \\ \vec{S}_u(1,0) & \vec{S}_{uv}(1,0) & \vec{S}_{uv}(1,1) & \vec{S}_u(1,1) \\ \vec{S}_u(1,0) & \vec{S}_v(1,0) & \vec{S}_v(1,1) & \vec{S}(1,1) \end{bmatrix}$$
(Equation 12)

Since a Bezier representation and a Hermite representation both define a respective (bi-)cubic polynomial, conversion may be performed between each representation. For example, a given Hermite curve may be represented as an equivalent Bezier curve, as shown concisely in Equation 13.

$$\begin{bmatrix} \vec{C}(0) \\ \vec{C}'(0) \\ \vec{C}'(1) \\ \vec{C}(1) \end{bmatrix} = [Hermite]^{-1} \cdot [Bezier] \cdot \begin{bmatrix} \vec{P}_{03} \\ \vec{P}_{12} \\ \vec{P}_{21} \\ \vec{P}_{30} \end{bmatrix} \quad \text{(Equation 13)}$$

Equation 14 elaborates Equation 13. Persons skilled in the art will recognize that this conversion may be generalized for converting patches.

$$\begin{bmatrix} \vec{C}(0) \\ \vec{C}'(0) \\ \vec{C}'(1) \\ \vec{C}(1) \end{bmatrix} = \begin{bmatrix} 2 & 1 & 1 & -2 \\ -3 & -2 & -1 & 3 \\ 0 & 1 & 0 & 0 \\ 1 & 0 & 0 & 0 \end{bmatrix}^T \cdot \begin{bmatrix} v^3 \\ v^2 \\ v \\ 1 \end{bmatrix} \quad \text{(Equation 14)}$$

$$\begin{bmatrix} 2 & 1 & 1 & -2 \\ -3 & -2 & -1 & 3 \\ 0 & 1 & 0 & 0 \\ 1 & 0 & 0 & 0 \end{bmatrix}^{-1} \cdot \begin{bmatrix} -1 & 3 & -3 & 1 \\ 3 & -6 & 3 & 0 \\ -3 & 3 & 0 & 0 \\ 1 & 0 & 0 & 0 \end{bmatrix} \cdot \begin{bmatrix} \vec{P}_{03} \\ \vec{P}_{12} \\ \vec{P}_{21} \\ \vec{P}_{30} \end{bmatrix}$$

Equations 15 and 16 illustrate a partial in u of the Hermite patch of Equation 12.

$$\vec{S}_u(u, v) = [3u^2 \quad 2u \quad 1 \quad 0] \cdot \begin{bmatrix} 2 & 1 & 1 & -2 \\ -3 & -2 & -1 & 3 \\ 0 & 1 & 0 & 0 \\ 1 & 0 & 0 & 0 \end{bmatrix} \cdot \quad \text{(Equation 15)}$$

$$\begin{bmatrix} \vec{S}(0,0) & \vec{S}_v(0,0) & \vec{S}_v(0,1) & \vec{S}(0,1) \\ \vec{S}_u(0,0) & \vec{S}_{uv}(0,0) & \vec{S}_{uv}(0,1) & \vec{S}_u(0,1) \\ \vec{S}_u(1,0) & \vec{S}_{uv}(1,0) & \vec{S}_{uv}(1,1) & \vec{S}_u(1,1) \\ \vec{S}_u(1,0) & \vec{S}_v(1,0) & \vec{S}_v(1,1) & \vec{S}(1,1) \end{bmatrix} \cdot$$

$$\begin{bmatrix} 2 & 1 & 1 & -2 \\ -3 & -2 & -1 & 3 \\ 0 & 1 & 0 & 0 \\ 1 & 0 & 0 & 0 \end{bmatrix}^T \cdot \begin{bmatrix} v^3 \\ v^2 \\ v \\ 1 \end{bmatrix}$$

$$\vec{S}_u(u, v) = [\vec{S}_u(0,0) \quad \vec{S}_{uv}(0,0) \quad \vec{S}_{uv}(0,1) \quad \vec{S}_u(0,1)] \cdot \quad \text{(Equation 16)}$$

$$\begin{bmatrix} 2 & 1 & 1 & -2 \\ -3 & -2 & -1 & 3 \\ 0 & 1 & 0 & 0 \\ 1 & 0 & 0 & 0 \end{bmatrix} \cdot \begin{bmatrix} v^3 \\ v^2 \\ v \\ 1 \end{bmatrix}$$

Equations 17 and 18 illustrate a partial in v of the Hermite patch of Equation 12.

$$\vec{S}_u(u, v) = [u^3 \quad u^2 \quad u \quad 1] \cdot \begin{bmatrix} 2 & 1 & 1 & -2 \\ -3 & -2 & -1 & 3 \\ 0 & 1 & 0 & 0 \\ 1 & 0 & 0 & 0 \end{bmatrix} \cdot \quad \text{(Equation 17)}$$

$$\begin{bmatrix} \vec{S}(0,0) & \vec{S}_v(0,0) & \vec{S}_v(0,1) & \vec{S}(0,1) \\ \vec{S}_u(0,0) & \vec{S}_{uv}(0,0) & \vec{S}_{uv}(0,1) & \vec{S}_u(0,1) \\ \vec{S}_u(1,0) & \vec{S}_{uv}(1,0) & \vec{S}_{uv}(1,1) & \vec{S}_u(1,1) \\ \vec{S}_u(1,0) & \vec{S}_v(1,0) & \vec{S}_v(1,1) & \vec{S}(1,1) \end{bmatrix} \cdot$$

$$\begin{bmatrix} 2 & 1 & 1 & -2 \\ -3 & -2 & -1 & 3 \\ 0 & 1 & 0 & 0 \\ 1 & 0 & 0 & 0 \end{bmatrix}^T \cdot \begin{bmatrix} 3v^2 \\ 2v \\ 1 \\ 0 \end{bmatrix}$$

$$\vec{S}_u(u, v) = [\vec{S}(0,0) \ \vec{S}_v(0,0) \ \vec{S}_v(0,1) \ \vec{S}(0,1)] \cdot \begin{bmatrix} 2 & 1 & 1 & -2 \\ -3 & -2 & -1 & 3 \\ 0 & 1 & 0 & 0 \\ 1 & 0 & 0 & 0 \end{bmatrix}^T \begin{bmatrix} 3v^2 \\ 2v \\ 1 \\ 0 \end{bmatrix}$$ (Equation 18)

As illustrated in Equations 16 and 18, only control points along the shared boundary are involved in calculating partials in u and v along a shared boundary. This conclusion is reasonable, as the Hermite patch formulation includes no "interior" control points, but is instead completely defined by boundary information, which is available for bit-exact sharing.

Figure 9:
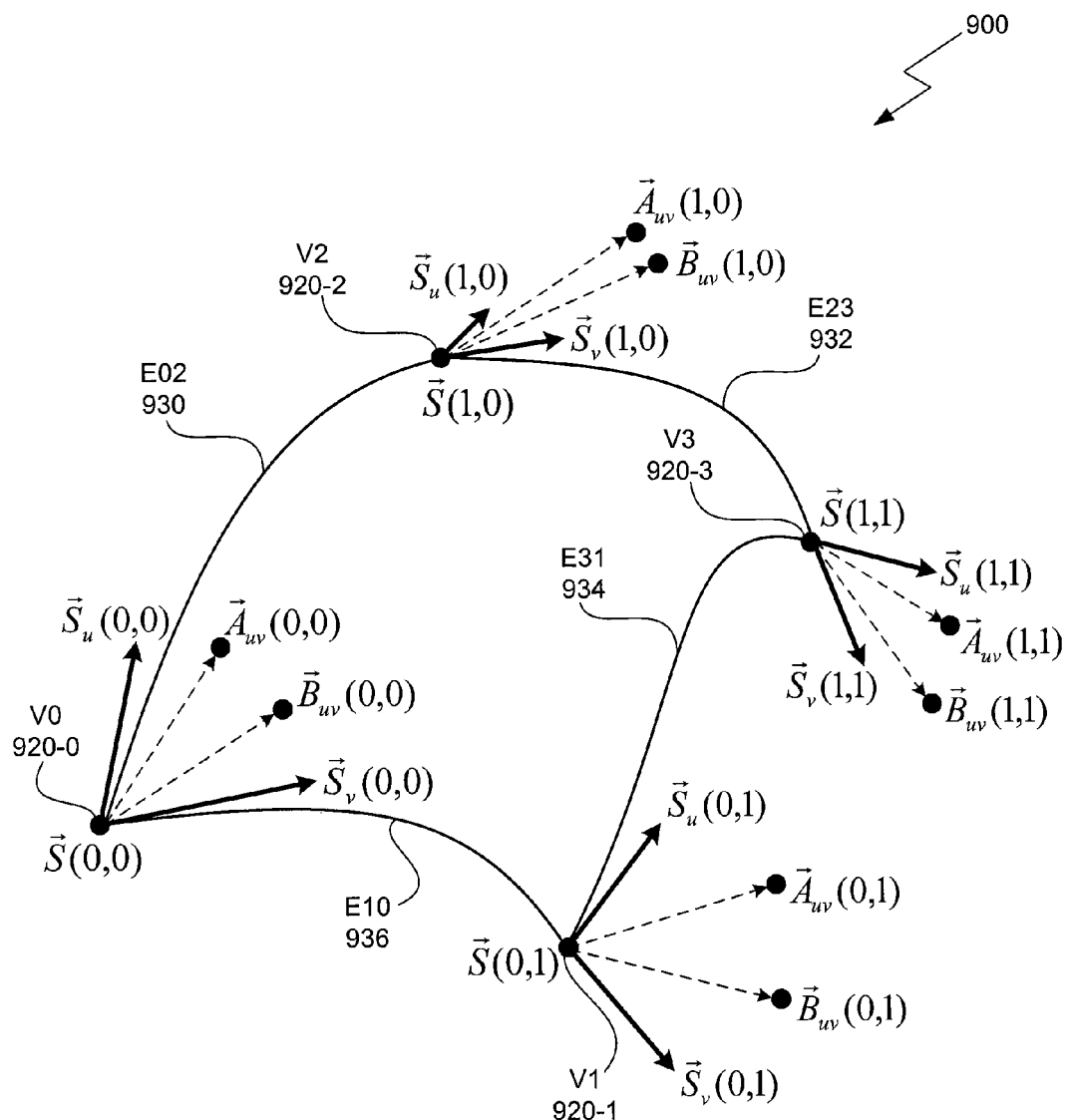
FIG. 9 illustrates a Hermite Gregory patch and related control parameters, according to one embodiment of the present invention.

FIG. 9 illustrates a Hermite Gregory patch 900 and related control parameters, according to one embodiment of the present invention. Each vertex 920 includes a position $\vec{S}()$, a partial in u $\vec{S}_u()$, a partial in v $\vec{S}_v()$, a first twist vector $\vec{A}_{uv}()$, and a second twist vector $\vec{B}_{uv}()$. For example vertex V0 920-0 includes position $\vec{S}(0,0)$, partial in u $\vec{S}_u(0,0)$, partial in v $\vec{S}_v(0,0)$, and twist vectors $\vec{A}_{uv}(0,0)$ and $\vec{B}_{uv}(0,0)$. Similarly, vertex 920-1 includes position $\vec{S}(0,1)$, partial in u $\vec{S}_u(0,1)$, partial in v $\vec{S}_v(0,1)$, and twist vectors $\vec{A}_{uv}(0,1)$ and $\vec{B}_{uv}(0,1)$, and so forth.

Each edge 930 is completely specified with respect to position and partials by two end vertices. For example edge 930-0 is completely specified by parameters for vertices V0 920-0 ($\vec{S}(0,0), \vec{S}_u(0,0), \vec{S}_v(0,0), \vec{A}_{uv}(0,0), \vec{B}_{uv}(0,0)$) and V2 920-2 ($\vec{S}(1,0), \vec{S}_u(1,0), \vec{S}_v(1,0), \vec{A}_{uv}(0,1), \vec{B}_{uv}(0,1)$). Importantly, partials along edge 930-0 are also completely specified by the parameters for vertices V0 920-0 and V2 920-2. Consequently, a regular mesh of Hermite Gregory patches is (bit-wise) exactly C0 and C1 along shared boundaries. Furthermore, because two independent twist vectors are available, the well-known "twist constraint" problem in the art is relieved similarly to the well-known solution associated with a Gregory patch, whereby two independent control points are available at each vertex and associated with each of two related boundaries, enabling overall mesh computations to be performed locally rather than requiring a global solution.

The original Gregory patch was defined as a generalization of a Bezier formulation to permit simple construction of C1 patch networks (meshes of patches) of arbitrary topology. As shown, simple linear transforms may be used to convert from a Bezier to a Hermite patch. The following illustrates an analogous Hermite Gregory patch that is equally simple to compute, given a standard Bezier-based Gregory patch as input. Note that the only difference between a Bezier patch and a Gregory patch is extra interior control points. The relationship between the mixed partial control point of Hermite patch and an interior Bezier control point ($P_{12,12}$) is given by Equation 19.

$\vec{S}_{uv}(0,0) = 9(P_{03,30} - P_{12,03} - P_{03,12} + P_{12,12})$ (Equation 19)

Equation 19 indicates the mixed partial solely depends on the four Bezier control points a respective corner of the Bezier patch. From this observation, the relationship between a Hermite Gregory patch twist vector and Bezier control points can be expressed in Equation 20.

$\vec{S}_{uv}(0,0) = 9(P_{03,30} - P_{12,03} - P_{03,12} + (\alpha P_{(A)12,12} + (1-\alpha) P_{(B)12,12}))$ (Equation 20)

An equivalent Hermite Gregory patch is therefore defined by adding four additional mixed partial control points analogously to the additional interior Bezier control points. In fact, the additional Hermite Gregory twist vectors may be directly computed from interior Bezier control points in this fashion. The term α represents a blending weight.

To evaluate the Hermite Gregory mesh, twist vectors $\vec{A}_{uv}()$ and $\vec{B}_{uv}()$ are combined for each vertex to generate a combined twist vector $\vec{S}_{uv}()$ for the corresponding vertex. The patch may be conventionally evaluated as a Hermite patch at (u,v) using the combined twist vectors $\vec{A}_{uv}()$, and $\vec{B}_{uv}()$ at (u,v). The twist vectors are combined according to their respective proximity to a boundary in (u,v) parameter space. When combining twist vectors $\vec{A}_{uv}()$ and $\vec{B}_{uv}()$, one scalar weight (Wa) is applied to twist vector $\vec{A}_{uv}()$ and one scalar weight (Wb) is applied to twist vector $\vec{B}_{uv}()$. In general, Wa+Wb=1.0. In one embodiment, twist vector $\vec{A}_{uv}()$ is associated with a constant v boundary, while twist vector $\vec{B}_{uv}()$ is associated with a constant u boundary. Each respective weight Wa, Wb is computed as a function of (u,v) when combining twist vectors $\vec{A}_{uv}()$ and $\vec{B}_{uv}()$. For example, at (1.0,0.0), Wa=1.0 and Wb=0.0, giving full weight to twist vector $\vec{A}_{uv}()$. Similarly, at (0.0,1.0), Wa=0.0 and Wb=1.0, giving full weight to twist vector $\vec{B}_{uv}()$. Along the line u=v line in parameter space, Wa=0.5 and Wb=0.5, giving equal weight to twist vectors $\vec{A}_v()$ and $\vec{B}_{uv}()$.

With the Hermite Gregory patch formulation providing C0 and C1 characteristics, displacement mapping may be performed, including along shared boundaries for ordinary vertices. A displacement map is used to displace vertices along a normal vector associated with each vertex, which is computed from partials associated with the vertex. Any technically feasible technique may be used to perform displacement mapping.

Figure 10:
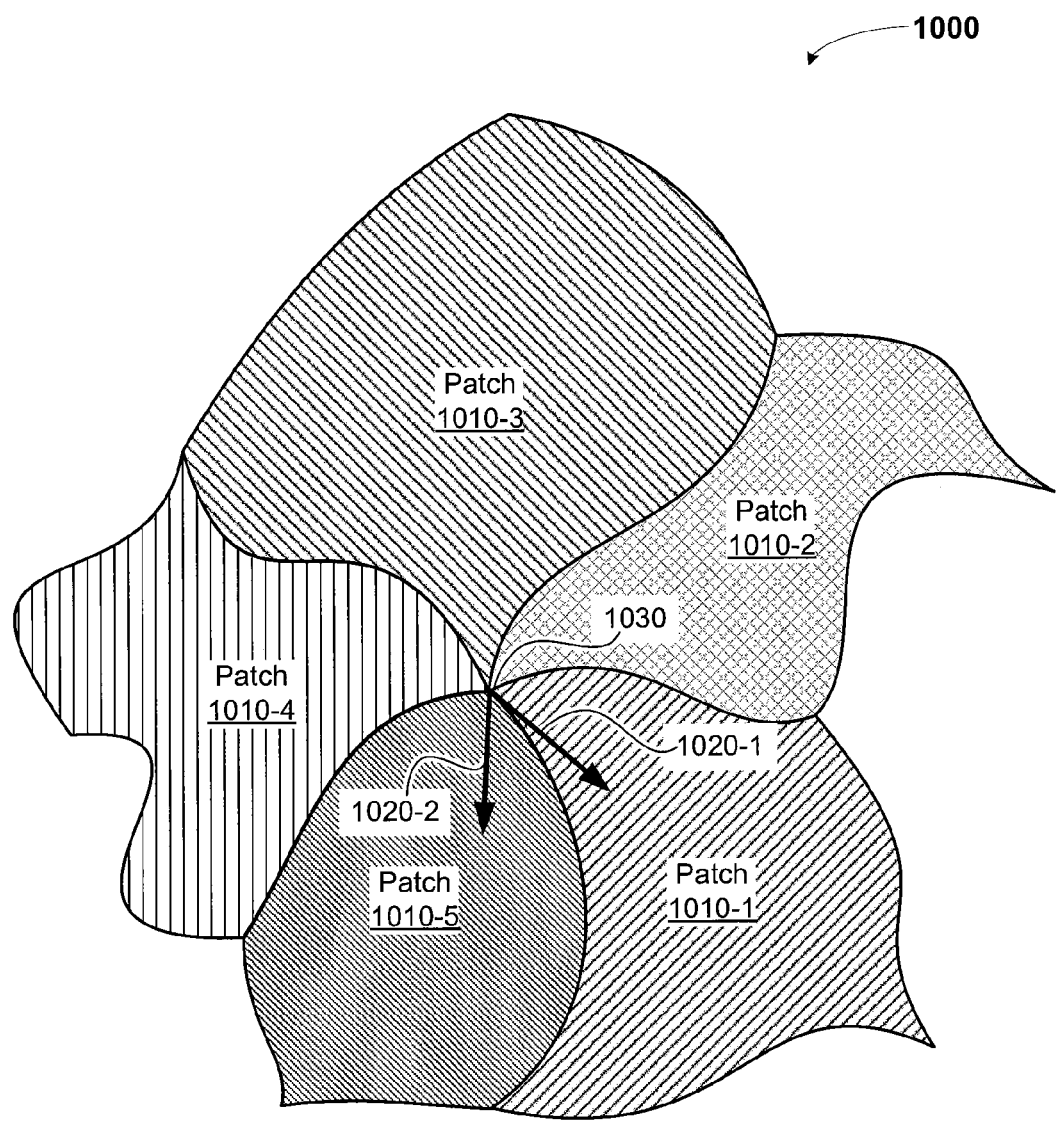
FIG. 10 illustrates a patch complex comprising five patches and one extraordinary vertex, according to one embodiment of the present invention.

FIG. 10 illustrates a patch complex 1000 comprising five patches 1010 and one extraordinary vertex 1030, according to one embodiment of the present invention. An extra ordinary vertex in a Hermite Gregory representation joins three, or five or more patches. As shown, extraordinary vertex 1030 joins the five patches 1010. As can be seen, boundary information cannot be made equal among all five incident patches. Note, for example, the tangent discontinuity between tangent vectors 1020-1 and 1020-2, even though they both lie in the same plane, a plane tangent to the surface of the extraordinary vertex 1030. An ordinary vertex in a Hermite Gregory representation joins four patches and associated cross boundary tangents and twist vectors are naturally equal and specified as having the same value.

Each Hermite Gregory patch 1010 requires two associated twist vectors, each shared with a neighboring cross boundary patch. Therefore, the patch complex 1000 only requires five twist vectors for the five patches 1010. The Hermite Gregory representation of each patch 1010 supplies a pair of twist vectors, and each twist vector of the pair of twist vectors is shared by a neighbor. Additionally, the patch complex 1000 requires five cross boundary tangents and one explicitly computed normal vector. In one embodiment, a consistently computed normal is stored at each vertex, such as extraordinary vertex 1030. The normal may be computed during a conversion phase. The normal is used for computing a displacement of the vertex during displacement mapping.

In one embodiment, rendering a subdivision surface is performed by converting a portion of the subdivision surface to a Hermite Gregory patch, including as many as eight additional cross-boundary derivatives (a pair for each extraordinary vertex, plus a consistently computed normal for each of the four corners). If there is only one extraordinary vertex, then a pair of tangents, and a single normal may suffice.

Figure 11:
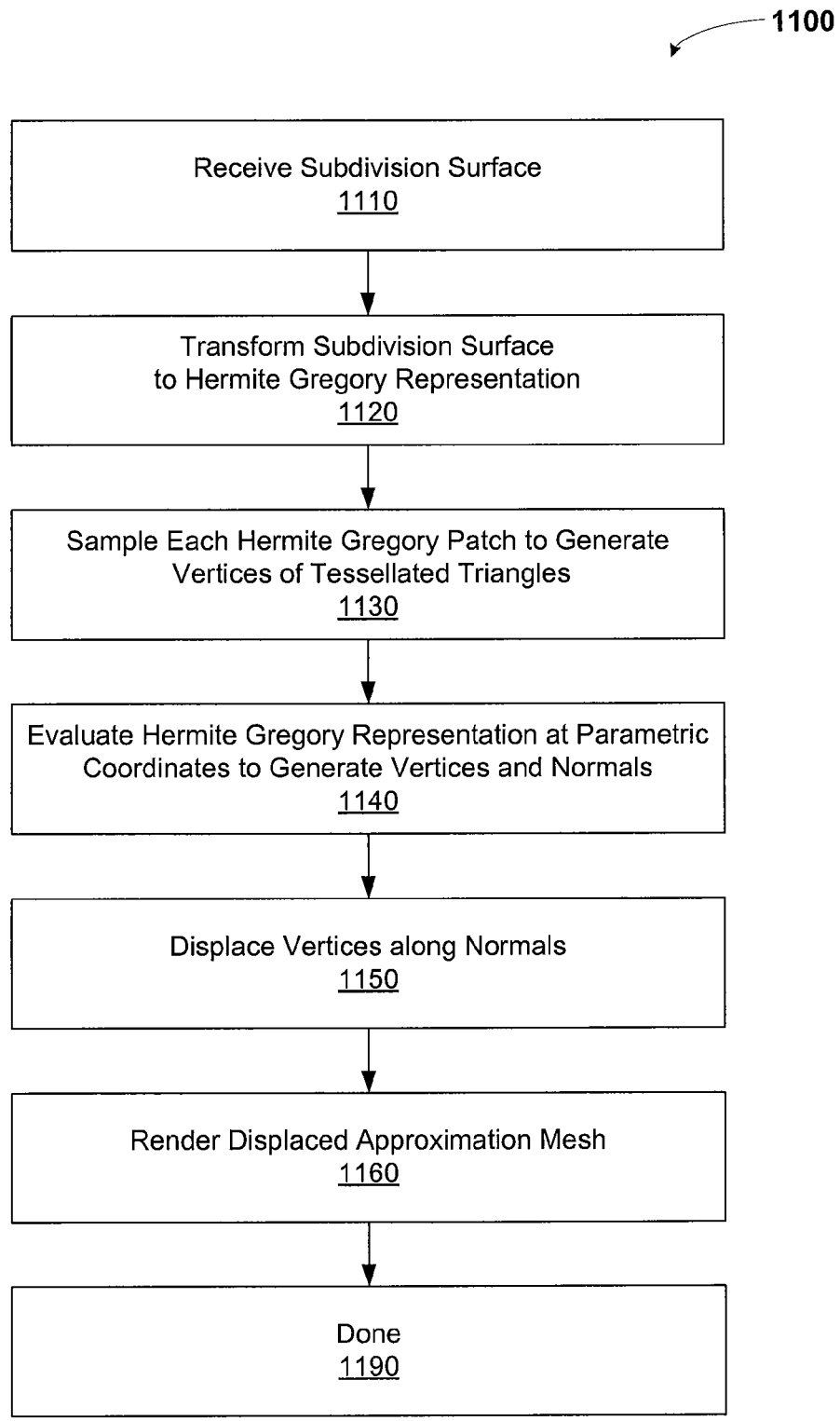
FIG. 11 is a flow diagram of method steps for evaluating a subdivision surface based on a Hermite Gregory formulation, according to one embodiment of the present invention.

FIG. 11 is a flow diagram of method steps 1100 for evaluating a subdivision surface based on a Hermite Gregory formulation, according to one embodiment of the present invention. Although the method steps are described in conjunction with the systems of FIGS. 1, 2, 3A, 3B, 3C, and 4 persons skilled in the art will understand that any system configured to perform the method steps, in any order, is within the scope of the inventions.

The method begins in step 1110, where the control hull processing unit 421 receives a subdivision surface. In step 1120, the hull processing unit 421 transforms the subdivision surface to a Hermite Gregory representation comprising one or more Hermite Gregory patches, according to techniques known in the art and principles described previously herein in conjunction with FIGS. 8 and 9. Each Hermite Gregory patch can approximate at least a portion of a limit surface of the subdivision surface. As also described previously herein, each Hermite Gregory patch includes four vertices, and each vertex includes a parameter for position, partial in u, partial in v, and two twist vectors.

In step 1130, tessellation unit 422 samples each Hermite Gregory patch to generate vertices of tessellated triangles representing the patch. Each sample comprises a point within a parametric u,v space for the patch. In step 1140, the domain evaluation processing unit 423 evaluates parametric sample points for each patch of the one or more Hermite Gregory patches to generate corresponding vertices and normal vectors for each patch based on techniques taught herein. The generated vertices represent position in a three-dimensional space, such as a three-dimensional Cartesian coordinate frame. Each one of the generated vertices includes a corresponding normal vector, which represents a surface normal at the vertex. The tessellated triangles comprise a pre-displacement approximation mesh of the subdivision surface.

In step 1150, the domain evaluation processing unit 423 displaces each vertex within the pre-displacement approximation mesh based on the corresponding normal vector and a displacement value to generate a displaced vertex. The displacement value is derived using any technically feasible displacement function or displacement map. Step 1150 produces a displaced approximation mesh comprising triangles, which may be rendered into an image that represents an approximation of the subdivision surface with displacement.

In step 1160, the displaced approximation mesh is rendered to generate a visual representation of the subdivision surface. Any technically feasible rendering technique may be used to render the displaced approximation mesh. The method terminates in step 1190.

In sum, a technique for watertight tessellation of displaced subdivision surfaces is disclosed. A subdivision surface is represented in terms of Hermite Gregory patches, which are completely defined by vertex parameters that may be shared between patches. Each Hermite Gregory patch comprises a Hermite patch augmented to include two twist vectors per vertex. The Hermite Gregory patches may be evaluated to render an approximate limit surface. A displacement operation may be performed to generate a displacement mesh of triangles, which may be rendered to generate a depiction of the subdivision surface with displacement.

One advantage of the present invention is that a displaced subdivision surface may be represented using patches specified by a set of concise, easily shared vertex parameters, thereby reducing required memory requirements for watertight tessellation of the displaced subdivision surface compared to prior art solutions.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for tessellating a displaced subdivision surface associated with a scene object, the method comprising:

receiving a subdivision surface that includes a first patch and a second patch that share two vertices; and, using one or more processors, transforming the first patch into a first transformed patch and the second patch into a second transformed patch, wherein each of the first and second transformed patches is defined by four vertices, and each vertex is associated with a position vector defined with respect to first and second parameters, a first derivative of the position vector with respect to the first parameter, a first derivative of the position vector with respect to the second parameter, and first and second twist vectors, wherein each twist vector is a second partial derivative with respect to the first and second parameters;

sampling each of the first and second transformed patches to generate a limit surface;

evaluating points of the limit surface to generate an approximation mesh that includes a plurality of evaluated vertices, wherein each evaluated vertex includes at least a position vector and a normal vector; and displacing each evaluated vertex of the approximation mesh according to a displacement map to generate a displaced approximation mesh that is reflective of the displaced subdivision surface and is used to render the scene object.

2. The method of claim 1, further comprising the step of rendering the displaced approximation mesh to generate an image representing the displaced approximation mesh.

3. The method of claim 1, wherein the displaced approximation mesh is represented in a three-dimensional Cartesian coordinate frame.

4. The method of claim 1, wherein each of the first patch and the second patch is by defined four vertices as well as a plurality of internal control points, and the step of transforming comprises, for the first patch, linearly transforming the four vertices and the plurality of control points defining the first patch into the four vertices defining the first transformed patch, and, for the second patch, linearly transforming the four vertices and the plurality of control points defining the second patch into the four vertices defining the second transformed patch.

5. The method of claim 1, wherein the sample points included in the limit surface correspond to vertices of a plurality of triangles comprising the displaced approximation mesh.

6. The method of claim 1, wherein a shared boundary between the first transformed patch and the second transformed patch is precisely defined geometrically by the two shared vertices.

7. The method of claim 6, wherein the position vector, the first derivative of the position vector with respect to the first parameter, the first derivative of the position vector with respect to the second parameter, and the first and second twist vectors associated with a first of the two shared vertices are identical to the position vector, the first derivative of the position vector with respect to the first parameter, the first derivative of the position vector with respect to the second parameter, and the first and second twist vectors, respectively, associated with a second of the two shared vertices.

8. The method of claim 1, wherein the step of transforming the first patch into the first transformed patch is performed by at least one thread executing within a processing unit.

9. A non-transitory computer-readable medium including instructions that, when executed by a processing unit, causes the processing unit to tessellate a displaced subdivision surface associated with a scene object, by performing the steps of:

receiving a subdivision surface that includes a first patch and a second patch that share two vertices;

transforming the first patch into a first transformed patch and the second patch into a second transformed patch, wherein each of the first and second transformed patches is defined by four vertices, and each vertex is associated with a position vector defined with respect to first and second parameters, a first derivative of the position vector with respect to the first parameter, a first derivative of the position vector with respect to the second parameter, and first and second twist vectors, wherein each twist vector is a second partial derivative with respect to the first and second parameters;

sampling each of the first and second transformed patches to generate a limit surface that includes a plurality of sample points;

evaluating the sample points included in the limit surface to generate an approximation mesh that includes a plurality of evaluated vertices, wherein each evaluated vertex includes at least a position vector and a normal vector; and displacing each evaluated vertex of the approximation mesh based on a displacement map to generate a displaced approximation mesh that is reflective of the displaced subdivision surface and is used to render the scene object.

10. The computer-readable medium of claim 9, further comprising the step of rendering the displaced approximation mesh to generate an image representing the displaced approximation mesh.

11. The computer-readable medium of claim 9, wherein the displaced approximation mesh is represented in a three-dimensional Cartesian coordinate frame.

12. The computer-readable medium of claim 9, wherein each of the first patch and the second patch is defined by four vertices as well as a plurality of internal control points, and the step of transforming comprises, for the first patch, linearly transforming the four vertices and the plurality of control points defining the first patch into the four vertices defining the first transformed patch, and, for the second patch, linearly transforming the four vertices and the plurality of control points defining the second patch into the four vertices defining the second transformed patch.

13. The computer-readable medium of claim 9, wherein the sample points included in the limit surface correspond to vertices of a plurality of triangles comprising the displaced approximation mesh.

14. The computer-readable medium of claim 9, wherein a shared boundary between the first transformed patch and the second transformed patch is precisely defined geometrically by the two shared vertices.

15. The computer-readable medium of claim 9, wherein the position vector, the first derivative of the position vector with respect to the first parameter, the first derivative of the position vector with respect to the second parameter, and the first and second twist vectors associated with a first of the two shared vertices are identical to the position vector, the first derivative of the position vector with respect to the first parameter, the first derivative of the position vector with respect to the second parameter, and the first and second twist vectors, respectively, associated with a second of the two shared vertices.

16. A computing device, comprising:

a processing unit coupled to the memory, the processing unit configured to:

receive a subdivision surface that includes a first patch and a second patch that share two vertices;

transform the first patch into a first transformed patch and the second patch into a second transformed patch, wherein each of the first and second transformed patches is defined by four vertices, and each vertex is associated with a position vector defined with respect to first and second parameters, a first derivative of the position vector with respect to first parameter, a first derivative of the position vector with respect to second parameter, and first and second twist vectors, wherein each twist vector is a second partial derivative with respect to the first and second parameters;

sample each of the first and second transformed patches to generate a limit surface that includes a plurality of sample points;

evaluate the sample points included in the limit surface to generate an approximation mesh that includes a plurality of evaluated vertices, wherein each evaluated vertex includes at least a position vector and a normal vector; and displace each evaluated vertex of the approximation mesh based on a displacement map to generate a displaced approximation mesh that is reflective of the displaced subdivision surface and is used to render the scene object.

17. The computing device of claim 16, further comprising a memory configured to store instructions that, when executed by the processing unit, cause the processing unit to receive the subdivision surface, transform the first patch into the first transformed patch and the second patch into the second transformed patch, sample each of the first and second transformed patches, evaluate the sample points, and displace the approximation mesh.

18. The computing device of claim 17, wherein at least one thread executing within the processing unit is configured to transform the first patch into the first transformed patch.

19. The computing device of claim 16, wherein the processing unit includes a hull shader configured to receive the subdivision surface, transform the first patch into the first transformed patch and the second patch into the second transformed patch.

20. The computing device of claim 19, wherein the processing unit includes a domain shader configured to evaluate the sample points and displace the approximation mesh.

* * * * *